United States Patent [19]
Egolf et al.

[11] Patent Number: 5,356,683
[45] Date of Patent: Oct. 18, 1994

[54] EXPANDABLE COATING COMPOSITION

[75] Inventors: Scott L. Egolf, Lansdale; Reginald T. Smart, Horsham, both of Pa.

[73] Assignee: Rohm and Haas Company, Philadelphia, Pa.

[21] Appl. No.: 144,962

[22] Filed: Oct. 28, 1993

[51] Int. Cl.$^5$ ............................................. B32B 3/00
[52] U.S. Cl. ..................................... 428/60; 427/222; 427/388.4; 427/389.9; 427/391; 428/290; 428/904.4; 521/54; 521/70; 521/72; 521/134
[58] Field of Search ............. 428/60, 290, 904.4; 427/222, 388.4, 389.9, 391; 521/54, 70, 72, 134

[56] References Cited

U.S. PATENT DOCUMENTS

| | | |
|---|---|---|
| 3,615,972 | 10/1971 | Morehouse, Jr. et al. |
| 3,678,098 | 7/1972 | Lewis et al. |
| 4,198,456 | 4/1980 | Adams et al. ........................ 260/348 |
| 4,489,192 | 12/1984 | Shih et al. ........................... 524/548 |
| 4,546,140 | 10/1985 | Shih .................................... 524/503 |
| 4,650,204 | 3/1987 | Rothenberg ....................... 428/904.4 |
| 4,900,604 | 2/1990 | Martinez et al. ................... 428/904.4 |
| 4,950,711 | 8/1990 | Suwala et al. ....................... 524/819 |

FOREIGN PATENT DOCUMENTS

| | | |
|---|---|---|
| 158247 | 1/1983 | Fed. Rep. of Germany . |
| 5359728 | 11/1976 | Japan . |
| 546646 | 12/1976 | Japan . |

Primary Examiner—Morton Foelak
Attorney, Agent, or Firm—Kevin E. McVeigh

[57] ABSTRACT

An expandable aqueous coating composition includes a polymeric binder including latex particles wherein the latex particles include a copolymer having a glass transition temperature of about −20° C. to about +60° C. and a weight average molecular weight of about 20,000 to about 500,000 and including expandable particles having a liquid blowing agent contained within a thermoplastic shell.

4 Claims, No Drawings

EXPANDABLE COATING COMPOSITION

TECHNICAL FIELD

The present invention relates to expandable coating compositions, more particularly to expandable coating compositions useful for making wallcoverings having a 3-dimensionally patterned surface.

BACKGROUND

Japanese Patent Disclosure No. 53-59728 discloses a heat-expansible covering composition produced by dispersing 5 weight percent to 50 weight percent, or, more preferably, 10 weight percent to 30 weight percent, heat-expansible microspheres in a crosslinking type synthetic resin emulsion. The crosslinking type synthetic resin emulsion is a an epoxy emulsion, a urethane emulsion, self-crosslinking type acrylic emulsion or a reaction type acrylic emulsion that may be crosslinked using a crosslinking agent. The covering is printed or coated onto a substrate and heated to expand and crosslink the coating and thereby form an ornamental material having an irregularly patterned layer on the surface of the substrate.

SUMMARY OF THE INVENTION

An expandable coating composition, useful for making 3-dimensionally patterned wallcoverings is disclosed. The expandable aqueous coating composition includes a polymeric binder and expandable particles, wherein the binder includes latex particles, the latex particles include a copolymer having a glass transition temperature of about −20° C. to about +60° C. and a weight average molecular weight of about 20,000 to about 500,000 and the expandable particles include a liquid blowing agent contained within a thermoplastic shell. The coating exhibits both a high expanded coating thickness per weight of coating and high abrasion resistance.

In another aspect of the invention, a method for making a 3-dimensionally patterned wallcovering is disclosed. The method includes applying a layer of the above-disclosed expandable aqueous coating to a substrate layer, and heating the coated substrate to dry the layer of coating and to expand the expandable particles of the coating.

DETAILED DESCRIPTION OF THE INVENTION

The expandable coating composition of the present invention includes a polymeric binder and expandable particles, each dispersed in an aqueous medium.

The polymeric binder of the coating of the present invention has rheological properties effective to allow the coating composition to undergo a high relative expansion during an initial heating and to subsequently exhibit physical properties effective to provide a durable expanded coating layer, that is, a coating layer that exhibits, for example, high flexibility and high resistance to abrasion, compression and blocking.

In a preferred embodiment, the polymeric binder is a copolymer that has a glass transition temperature ($T_g$) from about −20° C. to about 60° C., more preferably, from about 0° C. to about 45° C. and, even more preferably, from about 10° C. to about 30° C. The $T_g$ of the copolymer may be measured by, for example, differential scanning calorimetry. Alternatively, the reciprocal of the glass transition temperature of a particular copolymer composition may typically be estimated with a high degree of accuracy by calculating the sum of the respective quotients obtained by dividing each of the weight fractions of the respective monomers, $M_1$, $M_2$, ... $M_n$, from which the copolymer is derived by the $T_g$ value for the homopolymer derived from the respective monomer, according to an equation of the form:

$$1/T_{g(copolymer)} = \sum_{i=1}^{n} w_{(Mi)}/T_{g(Mi)} \tag{1}$$

wherein:

$T_{g(copolymer)}$ is the estimated glass transition temperature of the copolymer, expressed in °Kelvin (°K.);

$w_{(Mi)}$ is the weight fraction of repeat units in the copolymer derived from an $i^{th}$ monomer $M_i$; and $T_{g(Mi)}$ is the glass transition temperature, expressed in °Kelvin (°K.), of the homopolymer of an $i^{th}$ monomer $M_i$.

The glass transition temperature of various homopolymers may be found, for example, in "Polymer Handbook", edited by J. Brandrup and E. H. Immergut, Interscience Publishers.

Preferred copolymers include copolymers of monoethylenically unsaturated, that is, having a single ethylenically unsaturated site per molecule, monomers, for example, (meth)acrylate monomers, vinyl aromatic monomers, vinyl esters and mixtures thereof. Suitable monoethylenically unsaturated monomers include, for example, ethylene, butadiene, methyl methacrylate, ethyl acrylate, butyl acrylate, butyl methacrylate, isodecyl acrylate, 2-ethyl hexyl acrylate, hydroxyethyl methacrylate, hydroxypropyl methacrylate, acrylamide, methacrylamide, acrylonitrile, vinyl acetate, vinyl propionate, vinyl versatate, vinyl toluene, styrene and mixtures thereof.

In a preferred embodiment, the monoethylenically unsaturated comonomer is a monomer selected from the group consisting of methyl methacrylate, butyl acrylate, ethyl acrylate, ethyl hexyl acrylate, styrene, vinyl acetate, acrylonitrile and mixtures thereof.

In a preferred embodiment, the repeating units of the copolymer are each derived from the ethylenically unsaturated comonomer.

In an alternative preferred embodiment, the copolymer is a copolymer of a monoethylenically unsaturated carboxylic acid monomer and a monoethylenically unsaturated comonomer.

Suitable ethylenically unsaturated carboxylic acid monomers include, for example, acrylic acid, methacrylic acid, crotonoic acid, itaconic acid, aconitic acid, atropic acid, maleic acid, fumaric acid, vinyl acetic acid, vinyl benzoic acid and mixtures thereof.

The relative amounts of the monomers used to make the copolymer are selected so that the copolymer produced by polymerizing the selected monomers exhibits a $T_g$ in the desired range.

In a preferred embodiment, the repeating units of the copolymer are each derived from the ethylenically unsaturated comonomer. In a preferred embodiment, the copolymer includes from about 0.1 wt % to about 10 wt % monomeric units derived from the ethylenically unsaturated carboxylic acid monomer and about 90 wt % to about 99.9 wt % monomeric units derived from the ethylenically unsaturated comonomer.

In a highly preferred embodiment, the copolymer includes from about 2 wt % to about 8 wt % monomeric units derived from the ethylenically unsaturated carboxylic acid monomer and about 92 wt % to about 98 wt % monomeric units derived from the ethylenically unsaturated comonomer.

In a preferred embodiment, the copolymer includes up to about 20 wt % of a functional monomer, wherein the terminology "functional monomer" means a monomer having a first reactive functional group, for example, a site of ethylenic unsaturation, that renders the monomer copolymerizable with the monoethylenically unsaturated comonomer of the latex copolymer and a functional group that does not enter into the copolymerization reaction and provides a reactive site on the copolymer that is available to undergo further reaction.

In a preferred embodiment of the present invention, the copolymer is crosslinkable and includes repeating units derived from a functional monomer that provides a reactive site on the copolymer that is available for reaction with an external crosslinking agent. As used herein, the terminology "external crosslinking agent" means a polyfunctional compound which undergoes reaction with two or more reactive sites on the copolymer to crosslink the copolymer.

In a preferred embodiment, a hydroxy($C_1$–$C_6$)alkyl (meth)acrylate monomer such as, for example, hydroxyethyl methacrylate, hydroxypropyl methacrylate, is used as a functional monomer for providing reactive sites on the copolymer for subsequent reaction with an external crosslinking agent.

In a highly preferred embodiment, the copolymer is self-crosslinkable and includes repeating units derived from a latent crosslinking monomer. As used herein the terminology "self-crosslinkable" means that, under appropriate reaction conditions, the copolymer may be crosslinked without an external crosslinking agent and the terminology "latent crosslinking monomer" means a compound having a first reactive functional group that renders the compound copolymerizable with the monoethylenically unsaturated comonomer of the latex polymer binder and a second functional group that does not enter into the copolymerization reaction during formation of the binder, but provides a reactive site on the copolymer that may subsequently be reacted under different reaction conditions, for example, more severely elevated temperature, with another reactive site on the copolymer to crosslink the copolymer.

Suitable latent crosslinking monomers include, for example, methylol acrylamide (MOA), methylol methacrylamide (MIMAM), methyl acrylamidoglycolate methyl ether (MAGME), acrylamidoglycolic acid (AGA) and mixtures thereof, as well as quaternary ammonium monomers of the types disclosed in U.S. Pat. Nos. 3,678,098, 4,489,192 and 4,546,140.

In a highly preferred embodiment, the copolymer is self-crosslinkable and the latent crosslinking monomer is methylol acrylamide or methylol methacrylamide.

In a preferred embodiment, the copolymer is self-crosslinkable and includes about 0.25 wt % to about 10.0 wt %, preferably about 1.0 wt % to about 5.0 wt % and even more preferably about 2 wt % to about 5 wt % latent crosslinking monomer.

The copolymer has a weight average molecular weight, determined, for example, by aqueous gel permeation chromatography using a hydrolyzed sample of the copolymer, from about 20,000 to about 500,000, preferably from about 50,000 to about 300,000 and even more preferably from about 100,000 to about 250,000.

The copolymer of the polymeric binder of the present invention may be a mixture of copolymers, provided that the properties of the mixture satisfy the above-disclosed requirements for the copolymer. For purposes of the present invention, a mixture of copolymers satisfies the above disclosed requirements of the copolymer if the weighted average of the glass transition temperatures of the respective copolymers of the mixture is from about −20° C. to about 60° C. and the weighted average of the weight average molecular weights of the respective copolymers of the mixture is from about 20,000 to about 500,000. As used herein, the terminology "the weighted average of the glass transition temperatures of the respective copolymers of the mixture" means the sum of the respective products obtained by multiplying the weight fraction of each copolymer, $C_1$, $C_2$, ... $C_n$, in the mixture by the $T_g$ of that copolymer, according to an equation of the form:

$$T_{g(mixture)} = \sum_{i=1}^{n} w_{(Ci)} T_{g(Ci)} \quad (2)$$

wherein:

$T_{g(mixture)}$ is the glass transition temperature characterizing the mixture;

$w_{(Ci)}$ is the weight fraction of copolymer $C_i$ in the mixture; and $T_{g(Ci)}$ is the glass transition temperature of the copolymer $C_i$; and the terminology "weighted average of the weight average molecular weights of the respective copolymers of the mixture" means the sum of the respective products obtained by multiplying of the weight fraction of each copolymer $C_1$, $C_2$, ... $C_n$, in the mixture by the molecular weight of that copolymer, according to an equation of the form $$MW_{(mixture)} = \sum_{i=1}^{n} w_{(Ci)} MW_{(Ci)} \quad (3)$$

wherein:

$MW_{(mixture)}$ is the weight average molecular weight characterizing the mixture;

$w_{(Ci)}$ is the weight fraction of copolymer $C_i$ in the mixture; and $MW_{(Ci)}$ is the weight average molecular weight of the copolymer $C_i$.

The copolymer can be made by various conventional addition polymerization techniques for polymerizing ethylenically unsaturated monomers. Such techniques are well known in the art.

In a preferred embodiment, the copolymer is in the form of copolymeric latex particles and is made by free radical initiated, for example, using a persulfate or peroxide as a polymerization initiator, emulsion polymerization of a mixture of the ethylenically unsaturated carboxylic acid monomer and an ethylenically unsaturated comonomer. The emulsion may be stabilized by use of a colloidal stabilizer, an anionic surfactant stabilizer, a nonionic surfactant stabilizer, a cationic surfactant stabilizer or a mixture thereof.

The molecular weight of the latex copolymer of the emulsion of the preferred embodiment is controlled using a chain transfer agent. Suitable chain transfer agents include, for example, organosulfur chain transfer compounds such as mercaptans, alkyl mercaptans, mercaptoalcohols, diaryl sulfides, and halogen chain transfer compounds such as tetrabromomethane, carbon tetrabromide, bromotrichloromethane and bromoform.

In a preferred embodiment, from about 0.05 parts by weight (pbw) to about 2 pbw of an organosulfur chain transfer agent is used per 100 pbw monomeric reactants.

In a preferred embodiment, the emulsion includes from about 30 wt % to about 65 wt % polymer solids. In a more highly preferred embodiment, the emulsion includes about 45 wt % to about 65 wt % polymer solids.

In a preferred embodiment, the copolymeric particles have an average particle size from about 100 nanometers (nm) to about 450 nm.

In a preferred embodiment, the polymeric binder of the coating composition of the present invention is in the form of single-stage copolymeric particles. As used herein, the terminology "single-stage" copolymeric particles means copolymeric particles having a uniform composition, for example, the copolymer composition disclosed above, made, for example, by emulsion polymerization of a single copolymerization reaction mixture.

In an alternative embodiment, the polymeric binder of the coating composition of the present invention is in the form of two-stage copolymeric particles. As used herein, the terminology "two-stage" copolymeric particles means copolymeric particles having a shell portion comprising a copolymer of the copolymer composition disclosed above, surrounding a core portion comprising a copolymer of a copolymer composition dissimilar to that of the shell portion.

In a preferred embodiment, the copolymer of the core portion of the two-stage particles is a copolymer having repeating units derived from the group consisting of monoethylenically unsaturated monomers, monoethylenically unsaturated carboxylic acid monomers and mixtures thereof.

The relative amounts of the monomers used to make the copolymer of the core portions are selected so that the copolymer produced by polymerizing the selected monomers exhibits a $T_g$ in a desired range. In a preferred embodiment, the copolymer of the core portions of the respective particles has a $T_g$ from about $-20°$ C. to about $+105°$ C.

In a preferred embodiment of the two-stage particles, the copolymer of the particle cores of the respective particles has a $T_g$ that is different than the $T_g$ of the copolymer of the shell portions of the respective particles.

In a preferred embodiment of the two-stage particles, the copolymer of the core portions of the respective particles further includes about 0.05 wt % to about 10 wt % repeating units derived from a crosslinking monomer and is crosslinked during synthesis of the core portions. As used herein, the terminology "crosslinking monomer" means a monomer having a plurality of reactive functional groups that are copolymerizable with the monoethylenically unsaturated comonomer of the copolymer of the core portions of the two-stage particles and which react during synthesis of the core portions to crosslink the copolymer of the core portions.

Suitable internal crosslinking monomers include monomers having two or more ethylenically unsaturated sites per molecule, for example, aromatic crosslinking monomers such as divinylbenzene, divinyltoluene, trivinylbenzene; heterocyclic monomers such as divinylpyridine; aliphatic crosslinking monomers having two or more non-conjugated vinyl groups per molecule, such as trimethylolpropane trimethacrylate, ethylene glycol diacrylate, neopentyl glycol dimethacrylate, allyl acrylate; divinylaliphatic crosslinking monomers such as divinyl ketone and diethylene glycol divinyl ether; diacrylamides and dimethacrylamides such as N,N'-methylenediacrylamide; polyallyl aliphatic crosslinkers such as diallyl maleate, diallyl adipate, triallyl aconitate; the polyallyl and polyvinyl ethers of glycol, glycerol and pentaerythritol; aralkyl crosslinking monomers such as bisphenol-A dimethacrylate and the polyallyl and polyvinyl ethers of resorcinol; divinyl sulfone, divinyl sulfide, diallyl silicate, triallyl phosphate, and the monothio and dithio derivatives of glycols.

In a preferred embodiment of the two-stage particles, the copolymer of the core has a higher molecular weight than the copolymer of the shell, for example, a weight average molecular weight greater than about 500,000.

In a preferred embodiment, the two-stage copolymeric particles include about 20 wt % to about 80 wt % core portion and about 20 wt % to about 80 wt % shell portion.

The two-stage copolymeric particles are made, for example, by known emulsion polymerization techniques, wherein a copolymeric shell portion of one copolymer composition is polymerized over a copolymeric core portion of a dissimilar copolymer composition.

The two-stage approach allows the properties of the polymeric binder to be more precisely tailored to the desired end use, for example, to provide improved scratch and compression resistance while retaining the desirable flow properties of the low molecular weight single-stage polymeric binder.

In a preferred embodiment, a mixture of single-stage copolymeric particles and two-stage copolymeric particles may be used as the polymeric binder of the present invention.

The expandable particles of the coating composition of the present invention are those expandable particles comprising a thermoplastic resinous, generally spherical, shell within which is contained a liquid blowing agent, for example, the expandable particles disclosed in U.S. Pat. No. 3,615,972. The shell of the particles of the '972 patent include a thermoplastic resin derived from the polymerization of, for example, a alkenyl aromatic monomer, an acrylate monomer, a vinyl ester or a mixture thereof. The blowing agent of those particles includes a volatile fluid-forming agent having a boiling point below the softening point of the resinous shell, for example, aliphatic hydrocarbons including ethane, propene, isobutene, pentane, heptane. The particles expand upon heating to a temperature sufficient to permit plastic flow of the wall and to volatilize at least a portion of the blowing agent sufficient to provide adequate pressure to deform the shell of the particle. Suitable expandable particles are commercially available and include, for example, Expancel particles (Nobel Industries) and Micropearl particles (Matsumoto Yushi-Seiyaku Co. Ltd.).

In a preferred embodiment, the coating composition of the present invention includes from about 5 pbw to about 100 pbw mineral filler per 100 pbw polymer solids. Suitable mineral fillers include, for example, titanium dioxide, calcium carbonate, zinc oxide, kaolin clays, or a mixture thereof.

The coating composition includes a rheology modifier for adjusting the viscosity of the coating composition. Suitable rheology modifiers include polymeric thickeners such as, for example, cellulosic thickeners such as hydroxyethyl cellulose, carboxymethyl cellulose, associative thickeners such as nonionic hydrophobically modified ethylene oxide/urethane block copolymers, for example, Acrysol RM 825 (Rohm and Haas Co.), anionic hydrophobically modified alkali-soluble acrylic copolymers, for example Acrysol TT 615 (Rohm and Haas Co.), and alginate thickeners such as, for example, Kelgin MV (Kelco Division of Merck and Company, Inc.).

In a preferred embodiment, particularly in those embodiments wherein methylol acrylamide or methylol methacrylamide is included in the copolymer, a latent source of acidity, that is, a compound effective to lower the pH of the coating composition under the drying and curing conditions disclosed below, is included in the coating composition, preferably in an amount effective to provide a coating composition having a pH from about 1 to about 4.

In a highly preferred embodiment, the coating composition includes up to about 2 pbw of a compound selected from the group consisting of ammonium chloride, ammonium nitrate, ammonium citrate, diammonium phosphate, magnesium chloride, amine salts of p-toluene sulfonic acid and mixtures thereof, per 100 pbw copolymer solids.

The coating composition may, optionally, include up to about 15 pbw of an external crosslinking agent per 100 pbw copolymer solids. Preferred external crosslinking agents are those that undergo reaction with two or more reactive sites on the copolymer, for example, hydroxyalkyl groups, under the curing conditions set forth below and include, for example, polyfunctional isocyanate compounds, melamine resins, epoxy resins and urea-formaldehyde resins.

The coating composition may further include other additives known in the art, for example, antifoam agents, buffering agents, wetting agents, dispersants, humectants, biocides, coloring agents, brighteners, opacifiers, UV radiation absorbers and flame retardants.

In a preferred embodiment, the coating composition of the present invention is made by adding the expandable particles and any other components of the composition to an aqueous emulsion of the particles of polymeric binder and agitating the resultant mixture to provide a substantially homogeneous dispersion of the polymeric binder, the expandable particles and any other water-insoluble components of the coating composition in an aqueous medium.

In a preferred embodiment, the coating composition of the present invention includes from about 30 wt % to about 60 wt % water and from about 40 wt % to about 70 wt % total solids.

In a highly preferred embodiment, the coating composition includes from about 35 wt % to about 50 wt % water and from about 50 wt % to about 65 wt % total solids.

In a preferred embodiment, the total solids of the coating composition include from about 20 pbw to about 95 pbw polymeric binder, from about 0.1 pbw to about 15 pbw expandable particles, from about 0 pbw to about 45 pbw mineral filler and from about 0 pbw to about 5 pbw of a polymeric thickener.

In a highly preferred embodiment, the total solids of the coating composition includes about 30 pbw to about 90 pbw polymer binder, about 1 pbw to about 8 pbw expandable particles, about 2 pbw to about 30 pbw mineral filler and from about 0.001 pbw to about 2.0 pbw of a polymeric thickener.

The coating composition of the present invention is applied to a substrate layer by methods known in the art, such as for example, by blade coating, knife coating, rod coating, roll coating, screening, spraying or gravure printing.

Suitable substrate layers include, for example, woven textiles, nonwoven textiles, metal foils, papers, polymer films and composite substrates derived by combining substrate layers such as, for example, polymer-coated papers.

In a preferred embodiment, the substrate is a paper substrate or a vinyl-coated paper substrate.

In a preferred embodiment, the coating layer is applied by blade, rotary screen or gravure printing.

The coated substrate is then heated at a temperature effective to dry the coating, to expand the expandable particles of the coating layer and to drive reaction of the latent crosslinker compound. The heating is continued for a period of time effective to crosslink the polymeric binder of the expanded coating layer.

In a preferred embodiment, the coating layer is simultaneously dried, expanded and cured, that is, crosslinked, by exposure to a temperature of about 80° C. to about 220° C. for a time period of about 0.1 minute to about 5 minutes. More preferably, the coating layer is dried, expanded and crosslinked by exposure to a temperature of about 100° C. to about 160° C. for a time period of about 30 seconds to about 3 minutes.

In an alternative method, the coated substrate is heated at a first temperature for a first period of time to dry the coating but not expand the expandable particles or crosslink the coating and then heated at a second temperature for a second period of time to expand the expandable particles and crosslink the polymeric binder of the expanded coating.

In a preferred alternative embodiment, the coating layer is pre-dried by exposure to a temperature of about 80° C. to about 120 ° C. for about 5 seconds to about 30 seconds and then subjected to further heating as described above to expand and cure the coating.

The coating composition of the present invention is also useful as an expandable coating for printing a decorative 3-dimensionally patterned layer on a substrate to provide an article having an application other than as a wallcovering, for example, to provide a decorative coating layer on an article of clothing.

Example 1

An aqueous emulsion of single-stage copolymeric particles was made by the seeded-emulsion method set forth below.

A monomer emulsion was made by adding 113 g of a 45 wt % aqueous solution of a 1:1 acrylamide/methylol acrylamide mixture (MOA), 901 grams (g) ethyl acrylate (EA) and 748 g methyl methacrylate (MMA) to a mixture of 64 g a surfactant (Alipal EP-110, Rhone-Poulenc) and 450 g water. A catalyst solution was made by dissolving 10.2 g ammonium persulfate in 105 g water. 700 g water were charged to a 5 liter reaction vessel and heated to 90° C. 75 g of the catalyst solution was then added to the reaction vessel, followed by 64 g of an aqueous emulsion of copolymeric seed particles (29 g of acrylic copolymer solids having a nominal particle size of 60 nm). Beginning immediately thereafter, the monomer emulsion and the remaining catalyst solution were then fed into the reaction vessel at respective substantially uniform rates over a period of about 2.5 hours, while maintaining the temperature of the contents of the reaction vessel between about 84° C. and 86° C. After completion of the monomer emulsion and catalyst feeds, the contents of the reaction vessel were maintained at 80° C. to 84° C. for 30 minutes. The contents of the reaction vessel were cooled to room temperature and filtered through a 100-mesh screen and then a 325-mesh screen.

The properties the product emulsion are set forth below in TABLE 2.

EXAMPLES 2–11

The emulsions of Examples 2–11 were made by the process used to make the emulsion of Example 1, except that different amounts of the respective reactants were used, as set forth below in TABLE 1.

TABLE 1 sets forth the relative amounts, expressed as weight percents of the respective monomers and as parts by weight chain transfer agent, methyl mercaptopropionate (MMP), per 100 parts by weight total monomers (pbw/100 pbw monomer), of the reactants used to make the copolymer emulsions of Examples 1–11. The chain transfer agent was added as part of the monomer emulsions of Examples 2–7 and 9–11. Examples 6 and 7 included methylol methacrylamide (MIMAM) as a latent crosslinker and Examples 8–11 included an ethylenically unsaturated carboxylic acid monomer, that is, methacrylic acid (MAA).

TABLE 1

| Example No. | EA (wt %) | MMA (wt %) | MAA (wt %) | MOA (wt %) | MIMAM (wt %) | MMP (pbw/100 pbw monomer) |
|---|---|---|---|---|---|---|
| 1 | 53 | 44 | 0 | 3 | 0 | 0.00 |
| 2 | 51 | 46 | 0 | 3 | 0 | 0.25 |
| 3 | 51 | 46 | 0 | 3 | 0 | 0.50 |
| 4 | 51 | 46 | 0 | 3 | 0 | 0.75 |
| 5 | 51 | 46 | 0 | 3 | 0 | 1.00 |
| 6 | 51 | 46 | 0 | 0 | 3 | 0.00 |
| 7 | 51 | 46 | 0 | 0 | 3 | 0.50 |
| 8 | 68 | 19 | 10 | 3 | 0 | 0.00 |
| 9 | 68 | 19 | 10 | 3 | 0 | 1.00 |
| 10 | 51 | 41 | 5 | 3 | 0 | 0.25 |
| 11 | 60 | 32 | 5 | 3 | 0 | 0.25 |

The average particle size of each of the copolymeric particles of each of the latex emulsions of Examples 1–11 was measured using a BI-90 Particle Sizer.

The weight average molecular weight (MW) of the copolymeric particles of each of the latex emulsions of Examples 1–11 was measured by aqueous gel permeation chromatography (GPC) of the hydrolyzed copolymer. The copolymeric particles were hydrolyzed using a solution of potassium hydroxide in ethanol, accelerated by heating in a Parr cell at 180° C. for 72 hours. The ethanol-insoluble polymer residue was removed, rinsed with ethanol and dried by heating in a vacuum oven at 60° C. for 3 hours. The dried hydrolyzed polymer was then dissolved in buffered (pH=4) water and analyzed by GPC to determine the molecular weight of the hydrolyzed polymer.

The glass transition temperature ($T_g$) of the copolymeric particles of each of the latex emulsions of Examples 1–11 was calculated by equation (1).

The viscosity of each of the latex emulsions of Examples 1–11 was measured using a Brookfield LVT viscometer with a #2 spindle at 60 revolutions per minute.

The total solids, that is, the nonvolatile portion, of each of the emulsions was determined by weighting a sample of emulsion in an aluminum pan, drying the sample at 150° C. for 30 minutes and dividing the weight of the dried sample by the weight of the wet sample and then multiplying quotient so obtained by a factor of 100 to express the relative amount of solids in the sample as a wt %.

The copolymer particle size, expressed as nanometers (nm), the copolymer weight average molecular weight (MW), the copolymer $T_g$(°C.), the emulsion viscosity, expressed in centipoise (cPs), and the total solids, expressed as a percent of emulsion weight (wt %), are set forth below in TABLE 2 for each of the latex emulsions of Examples 1–11.

TABLE 2

| Example No. | Particle Size (nm) | MW | Tg (°C.) | Viscosity (cPs) | Total Solids (wt. %) |
|---|---|---|---|---|---|
| 1 | 230 | 503,550 | 26 | 81 | 52.8 |
| 2 | 230 | 158,720 | 30 | 92 | 52.7 |
| 3 | 251 | 76,160 | 30 | 141 | 52.7 |
| 4 | 257 | 48,000 | 30 | 136 | 52.8 |
| 5 | 256 | 52,608 | 30 | 136 | 52.8 |
| 6 | 227 | 1,225,000 | 30 | 64 | 52.8 |
| 7 | 236 | 80,754 | 30 | 38 | 51.3 |
| 8 | 251 | 457,520 | 14 | 74 | 51.9 |
| 9 | 256 | 25,172 | 14 | 58 | 51.8 |
| 10 | 251 | 146,160 | 30 | 64 | 52.8 |
| 11 | 272 | — | 20 | 110 | 55.5 |

EXAMPLE 12

Two latex emulsions were blended to provide a polymeric binder that included a mixture of copolymers.

The blended emulsion included 60 wt % polymer solids and the solids consisted of 60 wt % of an ethyl acrylate/methylol acrylamide copolymer and 40 wt % of an ethyl acrylate/styrene/methacrylic acid copolymer.

The ethyl acrylate/methylol acrylamide copolymer (97.5 wt % ethyl acrylate and 2.5 wt % methylol acrylamide) exhibited a weight average molecular weight of 143,520 and a $T_g$ of −19° C.

The ethyl acrylate/styrene/methacrylic acid copolymer (60 wt % ethyl acrylate, 20 wt % styrene and 20 wt % methacrylic acid) exhibited a molecular weight of 18,643 and $T_g$ of 28° C.

EXAMPLE 13

An emulsion of two-stage copolymeric particles was made.

The first stage, that is, the core portions of the respective two-stage particles was made. A monomer emulsion was made by adding 404 g ethyl acrylate, 372 g methyl methacrylate and 41 g methacrylic acid to a 2.5 wt % solution of a surfactant (Alipal EP-110) in water. A catalyst solution was made by dissolving 12.25 g ammonium persulfate in 135 g water. 750 g water were charged to a 5 liter reaction vessel and heated to 90° C. 95 g of the catalyst solution was then added to the reaction vessel, followed by 74.4 g of an aqueous emulsion of copolymeric seed particles (30.5 g of acrylic copolymer solids having a nominal particle size of 60 nm). Beginning immediately thereafter, the monomer emulsion, and 19 g of the catalyst solution were then fed into the reaction vessel at respective substantially uniform rates over a 1 hour period, while maintaining the temperature of the contents of the reaction vessel between about 84° C. and 86° C.

The second stage, that is, the shell portions of the respective two-stage particles was made. A monomer emulsion, consisting of 82 g of a 1:1 acrylamide/methylol acrylamide mixture (MOA), 689 g ethyl acrylate, 437 g methyl methacrylate, 3.1 g methyl mercaptopropionate, 61 g methacrylic acid, and 33.25 g of the remaining catalyst solution were separately fed into the first stage product mixture at respective substantially uniform rates over a 1.5 hour period, while maintaining the temperature of the contents of the reaction vessel between about 84° C. and 86° C. The temperature of the contents of the reaction vessel was maintained between 80° C. and 84° C. for 30 minutes following completion of the monomer and catalyst feeds. The contents of the reaction vessel were cooled to room temperature and filtered through a 100-mesh screen and then through a 325-mesh screen.

The relative amounts of reactants used are set forth below in TABLE 3 and the properties of the emulsion of Example 13 are set forth below in TABLE 4.

EXAMPLES 14 and 15

The latex emulsions of Examples 14 and 15 were made by the process used to make the latex emulsion of Example 13, except that different amounts of the respective reactants were used, as set forth below in TABLE 3.

TABLE 3 sets forth the relative amounts, expressed as weight percents (wt %) of the respective monomers and as parts by weight chain transfer agent per 100 parts by weight total monomers in the second stage monomer emulsion (pbw/100 pbw monomer) for the chain transfer agent, of the reactants used to make the first stage, that is, the cores portions, and the second stage, that is, the shell portions, of the respective copolymeric particles of Examples 13–15. In Example 14 and 15, allyl methacrylate (ALMA) was used to crosslink the polymer of the particle core.

TABLE 3

| Example No. | EA (wt %) | MMA (wt %) | MAA (wt %) | MOA (wt %) | ALMA (wt %) | MMP (pbw/100 pbw monomer) |
|---|---|---|---|---|---|---|
| 13 (core) | 49.5 | 45.5 | 5 | 0 | 0 | 0.00 |
| (shell) | 56.3 | 37.5 | 5 | 3 | 0 | 0.25 |
| 14 (core) | 48.65 | 44.75 | 5 | 1 | 0.6 | 0.00 |
| (shell) | 56.3 | 35.7 | 5 | 3 | 0 | 0.25 |
| 15 (core) | 48.65 | 44.75 | 5 | 1 | 0.6 | 0.00 |
| (shell) | 56.3 | 35.7 | 5 | 3 | 0 | 0.50 |

The average particle size, expressed in nanometers (nm), total solids, expressed as weight percent of the emulsion (wt %), and viscosity, expressed in centipoise (cps), of the emulsions of Examples 13–15 are set forth below in TABLE 4.

TABLE 4

| Ex. No. | Particle Size (nm) | Total Solids (wt. %) | Viscosity (cps) |
|---|---|---|---|
| 13 | 270 | 54.1 | 88 |
| 14 | 276 | 53.8 | 130 |
| 15 | 281 | 53.7 | 110 |

EXAMPLES 16A–16J, 17A–17C and 18A–18E

The latex emulsions of Examples 1–11 were used to make the expandable coating compositions of Examples 16A–16J, 17A–17C and 18A–18E, as set forth below. The following materials were used in addition to the latex emulsions of Examples 1–11 to make the expandable coating compositions of Examples 16A–16J, 17A–17C and 18A–18E:

defoamer (Foamaster O, Henkel Corp., Charlotte, N.C.);

mineral filler (TiO$_2$(Tioxide RFC6, Tioxide Inc., Quebec, Canada));

expandable particles (Micropearl F-1300, Matsumoto Yushi-Seiyaku Co., Ltd.), thickener (Acrysol RM-825, Rohm and Haas Company, Philadelphia, Pa.); and water.

The latex emulsions of Examples 1–9, 12 and 13–15 were used to formulate the respective expandable coating compositions of Examples 16A–16J and 17A–17C. The compositions of Examples 16A–16J each included 53.7 wt % total solids and the solids consisted of:

88.89 pbw copolymeric particles;
4.78 pbw expandable particles;
5.14 pbw mineral filler;
0.67 pbw thickener; and
0.52 pbw defoamer.

The latex emulsions of Examples 13–15 were used to formulate the respective expandable coating compositions of Examples 17A–17C. The compositions of Examples 17A–17C each included 55.7 wt % total solids and the solids consisted of:

89.08 pbw copolymeric particles;
4.81 pbw expandable particles;
5.16 pbw mineral filler;
0.54 pbw thickener; and
0.41 pbw defoamer.

The latex emulsion of Example 10 was used to formulate the respective expandable coating compositions of Examples 18A–18E. The composition of each of Examples 18A–18E, expressed in parts by weight on a solids basis (pbw) of polymer solids of the emulsion of Example 10, defoamer, mineral filler (TiO$_2$), expandable particles, thickener and parts by weight (pbw) water and the total solids of the coating composition, expressed as a percent of the weight of the composition (wt %) is set forth below in TABLE 5.

TABLE 5

|  | 18A | 18B | 18C | 18D | 18E |
|---|---|---|---|---|---|
| Emulsion (polymer solids) (pbw) | 49.62 | 48.69 | 47.80 | 46.93 | 46.10 |
| Defoamer (pbw) | 0.24 | 0.24 | 0.24 | 0.23 | 0.23 |
| TiO$_2$ (pbw) | 2.87 | 2.81 | 2.76 | 2.71 | 2.66 |
| Expandable Particles (pbw) | 0.0 | 1.31 | 2.57 | 3.79 | 4.96 |
| Thickener (pbw) | 0.37 | 0.36 | 0.35 | 0.35 | 0.34 |
| Water (pbw) | 46.90 | 46.59 | 46.28 | 45.99 | 45.70 |
| Total solids (wt. %) | 53.10 | 53.41 | 53.72 | 54.01 | 54.30 |

EXAMPLES 19A–19C

The latex emulsion of Example 11 was used to formulate the respective expandable coating compositions of Examples 19A–19C, as set forth below in TABLE 6.

The following materials were used in addition to those set forth above in Examples 16-18:
  glycerol (Aldrich Chemical Co., Milwaukee, Wis.);
  mineral filler (CaCO$_3$ (Hydrocarb 30, Omya Inc., Proctor, Vt.));
  dispersant (Calgon RS-1, Calgon Corp., Elwood City, Pa.); and
  latent source of acidity (NH$_4$NO$_3$ (Fisher Scientific, Fair Lawn, N.J.)).

The composition of each of Examples 19A-19C, expressed in parts by weight on a solids basis (pbw) of polymer solids of the emulsion of Example 11, glycerol, defoamer, mineral fillers (TiO$_2$ and CaCO$_3$), dispersant, expandable particles, NH$_4$NO$_3$, thickener and parts by weight (pbw) water as well as the total solids of the coating composition, expressed as a percent of the weight of the composition (wt %) is set forth below in TABLE 6

TABLE 6

|  | 19A | 19B | 19C |
|---|---|---|---|
| binder (polymer solids) | 49.44 | 38.13 | 30.47 |
| glycerol (pbw) | 1.91 | 1.47 | 1.17 |
| defoamer (pbw) | 0.23 | 0.17 | 0.14 |
| TiO$_2$ (pbw) | 2.85 | 1.18 | 1.88 |
| CaCO$_3$ (pbw) | 0.0 | 17.89 | 28.59 |
| dispersant (pbw) | 0.0 | 0.05 | 0.07 |
| Expandable particles (pbw) | 2.66 | 2.05 | 1.64 |
| NH$_4$NO$_3$(pbw) | 0.49 | 0.38 | 0.30 |
| thickener (pbw) | 0.01 | 0.005 | 0.004 |
| water (pbw) | 42.40 | 38.72 | 35.80 |
| Total Solids (wt %) | 57.60 | 61.28 | 64.20 |

EXAMPLE 20

The expandable coating compositions of Examples 16A-16J, 17A-17C, 18A-18E and 19A-19C were used to make wallcoverings of Examples 20A-20U.

The expandable coating compositions of Examples 16A-16J, 17A-17C and 19A-19C were applied to duplex paper (132 grams per square meter (g/m$^2$), STORA-Feldmuhle, Sandarne, Sweden) using a Gardner blade set at 6-8 mils clearance. The respective wet layers of the coatings of Examples 16A-16J, 17A-17C and 19A-19C were then each dried, expanded and cured in a single step by heating the coated paper in a Mathis oven at 160° C. for 1 minute to make the respective wallcoverings of Examples 20A-20M and 20S-20U.

The expandable coating compositions of Examples 18A-18E were applied to duplex paper (132 g/m$^2$, STORA-Feldmuhle, Sandarne, Sweden) using a Gardner blade set at 10 mils clearance. The respective wet layers of the coatings of Examples 18A-18E were each pre-dried by heating the coated paper at 90° C. for 30 seconds and were then each expanded and cured by heating the coated paper in a Mathis oven at 160° C. for 1 minute to make the respective wallcoverings of Examples 20N-20R.

Each of the wallcoverings was equilibrated at 72° F. and 50% relative humidity for 24 hours prior to testing.

The dry weight of coating applied and the height of the expanded coating layer were measured for each wallcovering.

The dry weight of coating applied to each wallcovering was measured by determining the difference in weight between respective coated and noncoated paper samples (4.95 centimeter diameter (0.00192 square meter) each).

The thicknesses of the respective coated and noncoated paper samples were determined using an Antes gauge and the thickness of the dried coating layer was calculated by determining the difference between the thickness of the coated paper sample and thickness of the respective noncoated paper sample for each wallcovering.

The identity of the coating composition applied (Coating Example #), the amount of coating composition applied, expressed as grams dry coating weight per square meter paper (g/m$^2$), the expanded coating height, expressed as millimeters coating thickness (mm) and weight specific coating height, expressed as expanded coating height normalized for a coating weight of 75 g coating per square meter paper (mm/75 g/m$^2$) are set forth below in TABLE 7 for each of the wallcoverings of Examples 20A-20U.

TABLE 7

| Wallcovering Example #/Coating Example # | Coating Weight (g/m$^2$) | Coating Height (mm) | Normalized Coating Height (mm/75 g/m$^2$) |
|---|---|---|---|
| 20A/16A | 83.1 | 0.47 | 0.42 |
| 20B/16B | 74.6 | 0.72 | 0.72 |
| 20C/16C | 72.8 | 0.75 | 0.77 |
| 20D/16D | 72.8 | 0.72 | 0.75 |
| 20E/16E | 74.6 | 0.76 | 0.76 |
| 20F/16F | 78.2 | 0.57 | 0.54 |
| 20G/16G | 77.1 | 0.75 | 0.73 |
| 20H/16H | 73.9 | 0.41 | 0.41 |
| 20I/16I | 70.2 | 0.65 | 0.70 |
| 20J/16J | 70.3 | 0.56 | 0.60 |
| 20K/17A | 81.0 | 0.60 | 0.56 |
| 20L/17B | 77.3 | 0.59 | 0.57 |
| 20M/17C | 81.0 | 0.65 | 0.61 |
| 20N/18A | 116.9 | 0.36 | — |
| 20O/18B | 124.7 | 0.66 | — |
| 20P/18C | 120.6 | 0.87 | — |
| 20Q/18D | 120.1 | 1.21 | — |
| 20R/18E | 119.5 | 1.46 | — |
| 20S/19A | 80.7 | 0.57 | 0.53 |
| 20T/19B | 84.6 | 0.53 | 0.47 |
| 20U/19C | 76.3 | 0.25 | 0.25 |

The scratch resistance of each of the expanded coating layers of the wallcoverings of Examples 20A-20U was evaluated by scratching the expanded coating layer with the thumbnail in an attempt to remove the entire thickness of the expanded coating layer from the underlying substrate and then rating the resistance of the coating layer on a scale of 1 to 10, as follows:

| Rating | Degree of Resistance |
|---|---|
| 0 | No resistance, can remove entire thickness easily |
| 1 | very slight resistance, can remove entire thickness |
| 2 | slight resistance, can remove entire thickness |
| 3 | slight-moderate resistance, can remove entire thickness |
| 4 | moderate resistance, can remove entire thickness |
| 5 | moderate-high resistance, can remove entire thickness |
| 6 | high resistance, can remove entire thickness |
| 7 | very high resistance, can remove entire thickness |
| 8 | moderate surface marring, no removal |
| 9 | slight-moderate surface marring, no removal |
| 10 | no marring or removal |

Control samples of coatings that provided ratings of 2.0 and 5.0 were routinely included in the evaluations for comparative purposes.

Face-to-face blocking resistance of each of the wallcoverings of Examples 20A-20U was measured by the method of ASTM D-4946-89, "Blocking Resistance of Architectural Paints". Samples were conditioned for 24 hours at 72° F. and 50% relative humidity prior to testing. The conditioned samples were placed face-to-face in a 120° F. oven for 30 minutes while a pressure of 1.8 pounds per square inch was applied to the samples. The samples were then removed from the oven, the pressure was discontinued and the samples were allowed to cool for 30 minutes at 72° F. and 50% relative humidity. The samples were then separated and the blocking resistance was rated on a scale of 1 to 10 wherein a rating of 0 indicated very poor performance and a rating of 10 indicated perfect performance.

The short time compressibility and recovery of each of the wallcoverings of Examples 20A–20U was measured at room temperature using a variation of ASTM test method F 36-88, "Compressibility and Recovery of Gasket Materials". Samples were conditioned for 24 hours at 72° F. and 50% relative humidity prior to testing. A light pre-load was applied to the sample for 15 seconds using only the foot pressure of an Ames thickness gauge equipped with a 0.75 inch diameter (0.442 square inches) foot. After pre-loading the sample, a 25 pound load (56.6 pounds per square inch) was applied to the sample for 60 seconds. The 25 pound load was then removed and the coating was allowed to recover for 60 seconds under the original pre-load. The compressibility, expressed as a percent, was determined according to the relationship expressed in equation (4):

$$\text{Compressibility} = 100\{(P-M)/P\} \quad (4);$$

wherein
P is the thickness of the coating tinder the pre-load condition, and
M is the thickness of the coating at the end of the 60 second full pound loading period;
and the recovery, expressed as a percent, was determined according to the relationship expressed in equation (5):

$$\text{Recovery} = 100\{(R-M)/(P-M)\} \quad (5);$$

wherein
P is the thickness of the coating tinder the pre-load condition,
M is the thickness of the coating at the end of the 60 second full pound loading period, and
R is the thickness of the coating at the end of 60 second recovery period.

The flexural properties of each of the wallcoverings of Examples 20A–20U was measured at room temperature by rapidly flexing the wallcovering sample over mandrels of different diameter with the substrate side in contact with the mandrel. The smallest mandrel diameter that was not associated with cracking of the coating layer was recorded. For Examples 20A–20R, the smallest mandrel diameter used was 0.32 cm. and the results are reported as less than or equal to (<)0.32 cm for wallcoverings which did not exhibit cracking when tested at that mandrel diameter. Samples were conditioned for 24 hours at 72° F. and 50% relative humidity prior to testing. Decreasing numerical value of the mandrel diameter in the results reported below correlates with increasing coating layer flexibility.

The scratch resistance (rating on a scale of 1 to 10), block resistance (rating on a scale of 1 to 10), percent compression (%), calculated according to equation (4) above, percent compression recovery (%), calculated according to equation (5) above, and the smallest mandrel diameter not associated with cracking of the coating layer, expressed in centimeters (cm), are set forth below in TABLE 8 for each of the respective wallcoverings of Examples 20A–20U.

TABLE 8

| Example No. | Scratch Resistance | Block Resistance | Compression (%) | Recovery (%) | Mandrel Diameter (cm) |
|---|---|---|---|---|---|
| 20A | 5.5 | 7.5 | 58.1 | 28.0 | ≦0.32 |
| 20B | 5.0 | 5.5 | 55.7 | 38.4 | 0.64 |
| 20C | 4.0 | 5.0 | 58.3 | 36.2 | 0.95 |
| 20D | 3.0 | 5.5 | 61.4 | 40.0 | 1.27 |
| 20E | 3.0 | 5.0 | 63.7 | 41.9 | 1.11 |
| 20F | 5.5 | 7.0 | 48.8 | 25.7 | ≦0.32 |
| 20G | 4.0 | 5.0 | 58.3 | 40.5 | ≦0.32 |
| 20H | 5.0 | 7.0 | 62.0 | 38.8 | ≦0.32 |
| 20I | 1.5 | 5.0 | 80.0 | 44.0 | ≦0.32 |
| 20J | 2.0 | 4.5 | 62.2 | 34.0 | 0.48 |
| 20K | 4.4 | — | 49.5 | 40.4 | ≦0.32 |
| 20L | 4.1 | — | 46.2 | 27.9 | ≦0.32 |
| 20M | 2.6 | — | 53.4 | 27.3 | ≦0.32 |
| 20N | 9.5 | — | 85.7 | 60.4 | ≦0.32 |
| 20O | 4.0 | — | 48.1 | 36.0 | 0.64 |
| 20P | 2.8 | — | 40.2 | 25.5 | 0.64 |
| 20Q | 2.5 | — | 36.1 | 31.9 | ≦0.32 |
| 20R | 1.8 | — | 37.4 | 29.1 | 1.27 |
| 20S | 3.9 | 6.0 | 56.7 | 47.1 | 0.05 |
| 20T | 3.8 | 6.0 | 44.0 | 40.5 | 0.05 |
| 20U | 3.3 | 6.5 | 42.5 | 41.2 | 0.05 |

The aqueous expandable coating composition of the present invention provides high expanded coating thickness per weight of coating and provides an expanded coating layer that exhibits good physical properties such as scratch resistance, block resistance, compression resistance and flexibility.

We claim:
1. A method for making a wallcovering, comprising; applying a layer of an expandable aqueous coating to a substrate layer, said coating comprising:
   a polymeric binder, said binder comprising latex particles, said latex particles comprising a copolymer having a glass transition temperature of about −20° C. to about +60° C. and a weight average molecular weight of about 20,000 to about 500,000; and
   expandable particles, said expandable particles comprising a liquid blowing agent contained within a thermoplastic shell;
heating the coated substrate to dry the layer of coating and expand the expandable particles.
2. The method of claim 1, wherein the substrate layer is selected from the group consisting of papers, coated papers, polymer films, nonwoven textiles, woven textiles and metal foils and combinations thereof.
3. The method of claim 1, wherein the copolymer is a crosslinkable copolymer and wherein the copolymer is crosslinked during the heating step.
4. A wallcovering made by the method of claim 1.

* * * * *

UNITED STATES PATENT AND TRADEMARK OFFICE
CERTIFICATE OF CORRECTION

PATENT NO. : 5,356,683

DATED : October 18, 1994

INVENTOR(S) : Scott L. Egolf, Reginald T. Smart

It is certified that error appears in the above-indentified patent and that said Letters Patent is hereby corrected as shown below:

Column 14, line 4 "Antes" should be --Ames--

Column 15, line 34 "tinder" should be --under--

Column 15, line 45 "tinder" should be --under--

Column 15, line 59 "(<)" should be --($\leq$)--

Signed and Sealed this

Second Day of May, 1995

Attest:

BRUCE LEHMAN

Attesting Officer

Commissioner of Patents and Trademarks